June 1, 1954
M. CARTER
2,680,140
PROCESS FOR PREPARING SPONGE RUBBER
FROM LATEX AND PRODUCT
Filed April 5, 1949
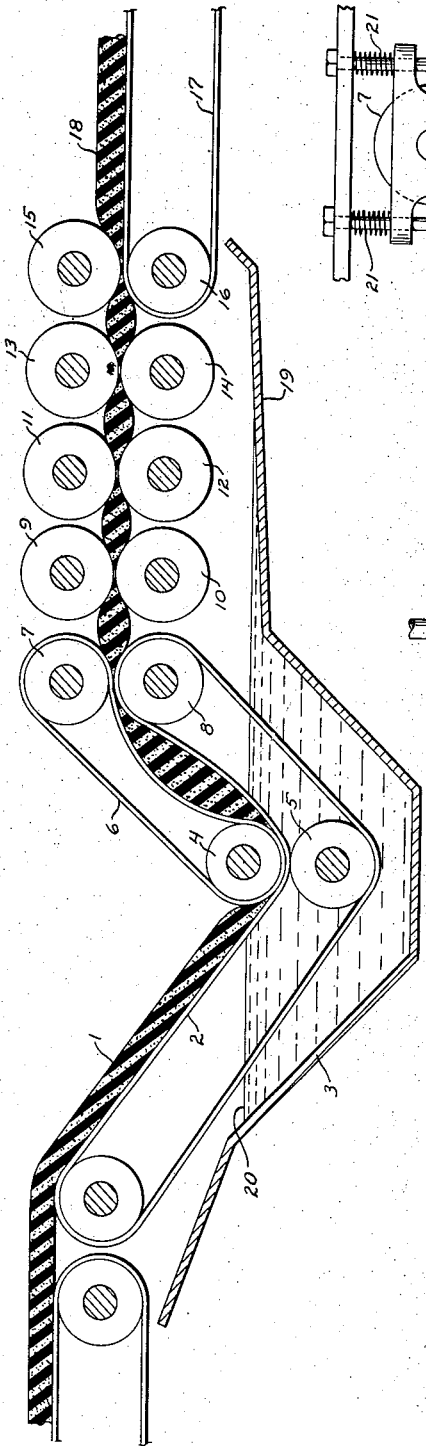
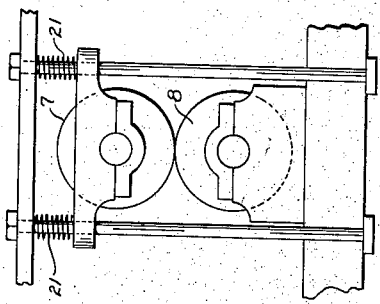
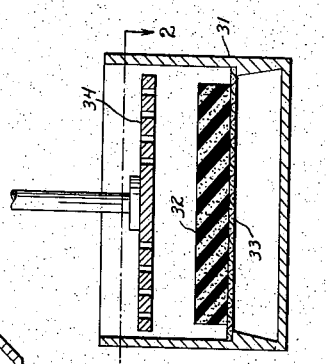
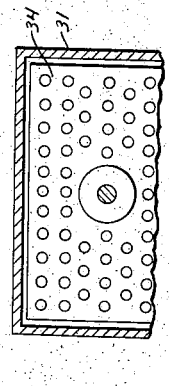
INVENTOR.
MITCHELL CARTER
BY
Attorney Patented June 1, 1954

2,680,140

UNITED STATES PATENT OFFICE 2,680,140

PROCESS FOR PREPARING SPONGE RUBBER FROM LATEX AND PRODUCT

Mitchell Carter, Yardley, Pa.

Application April 5, 1949, Serial No. 85,521

7 Claims. (Cl. 260—723)

This invention relates to rubber latices, rubber products, their preparation, and use.

It includes sponge rubbers which contain at least twenty-five or fifty parts by weight (based on the weight of the rubber) of an oil, preferably white oil. Part or all of the oil may be incorporated in the latex from which the sponge is prepared, and part or all of the oil may be incorporated in the sponge after curing. The invention includes a new method of producing foamed latex sponge using oleic acid. It includes the use of a new latex of high rubber and oil content and low water content and the resulting products. New apparatus is included as a part of the invention, as well as new processes and new products.

DEFINITIONS

Sponge rubber includes foamed-latex sponges and chemical sponges. Foamed-latex sponges are sponges obtained by curing a mechanically foamed latex. Chemical sponges are obtained by curing chemically blown latex or chemically blown milled rubber. Foam is the aerated latex before vulcanization.

An open sponge is one with intercommunicating cells which also communicate with at least one surface of the sponge.

White oil is a clear, odorless, paraffin-base mineral oil with a specific gravity of about 0.85, a distillation range around 700° F., a fire point around 365° F., and a very low freezing point.

Identation is the load required to compress a sponge rubber 25 per cent of its original height between parallel plates. The determinations referred to herein were made as prescribed in A. S. T. M. Standards on Rubber Products (American Society for Testing Materials, Philadelphia, Pa., February 1948, pages 406–7).

DRAWINGS

Fig. 1 shows more or less diagrammatically a vertical section through apparatus for the treatment of a unit of sponge;

Fig. 2 is a plan view of the plunger of Fig. 1;

Fig. 3 is a vertical section through equipment for continuous immersion of the sponge in oil with means for removing excess oil and thereafter kneading the sponge; and Fig. 4 is an end view of means for maintaining pressure between the rolls.

THE INVENTION

The sponge rubber of the prior art, as described in the patents and the literature, is described as including a minor portion of an oil. There is no art on the use of as much as twenty-five or fifty or more parts of oil per 100 parts of rubber in the sponge. According to this invention an oil, preferably a mineral oil, is embodied in the sponge to an extent equal to at least twenty-five or fifty per cent by weight of the rubber. The preferred oil is white oil. The sponge may contain as much as several hundred per cent of oil by weight (based on the weight of the rubber). The cost of the sponge may thus be materially reduced. Likewise, the properties of the sponge may be improved and for this purpose other oils than mineral oils may be employed, such as animal and vegetable oils.

The sponge of this invention may be produced from ordinary cured rubber sponge by uniformly dissolving oil into the rubber of the sponge. The properties of the oil-containing product are improved if a sponge which is slightly undercured is employed. If oil is incorporated in the latex before curing, the cured product will dissolve more oil than a cured sponge to which no oil has been added prior to curing. Cured sponge will dissolve about one hundred per cent by weight of white oil, whether or not oil has been added to the latex from which the sponge has been made. The cured sponge may contain as much as three hundred parts up to five hundred parts or more of oil (based on the weight of the rubber). A sponge which contains as little as fifty parts by weight of white oil is much cheaper than a sponge containing no oil. If it contains as much as several hundred parts of the white oil, its cost may not be more than half the cost of a sponge which contains no oil and it will be more valuable than such other sponge for various purposes.

In a preferred method of producing sponge into which oil is incorporated prior to curing (and into which additional oil may be dissolved after curing) sufficient oil is added to the latex from which the foam is produced, to cause the foam to set without the aid of a gelling agent. The addition of a small amount of oleic acid facilitates the incorporation of mineral oil into natural latex and the oleic acid is preferably incorporated in the oil before adding it to the latex. By using no more than several parts of oleic acid per one hundred parts of the rubber in natural-rubber latex, and by using twenty-five or fifty, up to several hundred parts by weight of white oil based on the weight of the rubber, and adding this solution of oleic acid in oil to a foam of natural-rubber latex while beating to maintain the foam, and then pouring into a mold and curing, a cheap cured product is obtained which has desirable properties and into which additional white oil can be dissolved, further cheapening the product and altering its properties.

A very small amount of oleic acid gives desirable properties to a foam of natural-rubber latex which contains no oil. On curing a sponge of greatly improved tensile is produced. The oleic acid serves as a foam-sustaining agent, and may be used either with or without a foaming or gelling agent or both. The air cells in such a sponge are rounder than in ordinary sponge and the cushioning effect of such a sponge is superior, for most purposes, to any foamed-latex sponge produced by the prior art.

Although the new methods and products disclosed herein which utilize oil relate more particularly to the production of products from natural rubber, it will be apparent that synthetic rubbers may be employed to the extent that oil is soluble in them. Thus, the sponge rubber into which oil is dissolved after curing may be, for example, sponge of GR–S (rubber-like copolymer of butadiene and styrene) in which an animal, vegetable or mineral oil is absorbed. Likewise latices of GR–S, etc. may have oil incorporated in them after foaming. Certain rubbers, such as the nitrile rubbers, are ordinarily considered oil-resistant and for such rubbers petroleum or other insoluble oils are unsatisfactory, but to the extent that oils may be incorporated into any rubber latex (natural or synthetic) and dissolved into a sponge composed of any cured rubber (natural or synthetic) to improve its properties the invention includes all rubbers and oils soluble therein, particularly when the oil is cheap and used in sufficient quantity to cheapen the rubber.

TESTING OF NATURAL-RUBBER LATEX

Natural-rubber latex varies in properties. Its surface tension, interfacial tension, hydrogen-ion concentration, and chemical and mechanical stabilities vary over a wide range. Such variations affect the properties of the latex to such an extent that one latex, if subjected to certain treatment, as for example in the production of a foam for the manufacture of sponge, will behave differently from another latex subjected to the same treatment.

I have found that in sponge manufacture, if the mechanical stability is kept substantially uniform, or changes in the formulation or treatment are made to compensate for changes in the mechanical stability, most variations in the other properties may be disregarded. In the past considerable attention has been directed to changes in the hydrogen-ion concentration. This does not necessarily control the mechanical stability.

If a latex with a mechanical stability of 250 seconds works well with a given formula and process, a variation in either direction of as little as 15 or 25 seconds will affect the processing and final product. With a variation of 50 seconds the operation and product may be unsatisfactory and with a variation of over 50 seconds they may be a failure.

Many things affect the mechanical stability of the latex, such as the season in which it is taken from the tree, the species of the tree, the age of the latex, all conditions under which it is transported, the temperature at which it is stored, and the variations in temperature to which it is subjected, agitation of any kind, and the presence or absence of substances (liquids or solids) in the latex even though they be of the same pH as the latex.

I have found that in the formation of foam for the production of sponge using oleic acid as a foam-sustaining agent, as herein described, it is desirable to bring the latex to the optimum stability for that operation by blending different latices of different stability from different drums, etc., and then storing the blended latex at constant temperature until it is used.

Creamed and centrifuged latices with a high total solids such as sixty per cent and over, are generally preserved with ammonia. The creamed latices have a much higher stability than the centrifuged latices due to the creaming agent remaining in them, and generally are not as satisfactory as the centrifuged latices for the production of sponge because they give a more frothy or disconnected structure.

For the purpose of this specification mechanical stability is to be determined as follows: The top blade and bottom nut are removed from an Oster soda fountain mixer leaving a single blade 1 inch in diameter and ⅝ inch above the bottom of the shaft. A vessel 1½ inches square and 3½ inches high is used. The wall is shaped from 26 gauge stainless steel. The bottom is a sheet of the steel 2½ inches square. The wall is soldered to it on the outside so as to retain a perfectly smooth inner surface. Fifty cubic centimeters of the latex which has been stored 24 hours at 70° F. are put in the vessel which has been standing in a room maintained at 70° F. and the determination is made at this room temperature. The mixer is started and when operating at 17,000 R. P. M. the mixing shaft is centered in the vessel with the bottom of the shaft ⅜ inches above the bottom of the vessel. No water bath is used and during the test the temperature of the latex will rise. The stirring causes the latex to become semi-solid and revolve with the mixer blade, simultaneously breaking away from the corners of the vessel, leaving air voids in the corners. During this treatment the volume of the latex increases and then decreases just before such coagulation takes place. The measure of mechanical stability is the time of agitation required to cause the latex to become sufficiently solid to revolve with the mixer blade and break away from the corners of the vessel.

To illustrate various influences affecting mechanical stability a certain latex with a mechanical stability of 150 seconds, was divided into several parts. Each part was treated differently by mixing another ingredient with it or subjecting it to temperature changes, and the change in mechanical stability was noted and is recorded below:

| Mechanical Stabilities | Seconds |
| --- | --- |
| Latex | 150 |
| 50 gm. latex plus 2 drops oleic acid | 264 |
| 50 gm. latex plus 2 drops 50% ammonium nitrate | 112 |
| 50 gm. latex plus 2 drops green soap | 218 |
| 50 gm. latex plus 2 drops 25% Darvan solution | 176 |
| 50 gm. latex plus 5 cc. water | 230 |
| 50 gm. latex plus 5 cc. 26% ammonia | 270 |
| 50 gm. latex plus 5 grams dispersed compounding ingredients | 55 |
| Same as preceding with 2 drops oleic acid added | 188 |
| Latex cooled to 33° F., then reheated to 70° F | 105 |
| Latex heated to 100° F | 80 |

OLEIC ACID AS A FOAM-SUSTAINING AGENT

Natural latex of the high solids content customary in industry, when foamed mechanically, coagulates if the foaming operation is continued a sufficiently long time. The foam does not persist, but breaks down on standing and when heated to cure.

To overcome this a foaming agent or gelling agent or both are ordinarily incorporated in natural latex before or during foaming. The usual foaming agents are soaps, licorice, glue, casein, saponin and egg albumen, etc. The usual gelling agents include ammonium nitrate, sodium silico fluoride, etc. When a gelling agent is used the latex foam of the prior art must be quickly molded. Otherwise it will set up in the beater. The time of molding is so critical that the use of gelling agents presents various disadvantages in commercial operations.

It is believed that the foaming agents usually employed form a coating on the individual rubber particles in the latex, and their presence at the surface of the particles reduces the strength of the bond formed between the rubber particles when vulcanized. However this may be, the fact is that by omitting both the foaming and gelling agents, and using a small amount of oleic acid as a foam-sustaining agent, to preserve the cell structure of the foam before and during vulcanization, sponge of high tensile strength is produced. When a foaming agent is used it forms a film over the surface of the individual rubber particles which persists after vulcanization giving a non-homogeneous product which has a lower tensile than a product in which no foaming agent has been used. The production of foam using oleic acid as a foam-sustaining agent may be controlled to obtain a sponge of much lighter gravity than that produced from latex foamed by the usual processes. Furthermore, the beating or other treatment of this latex to form or maintain a foam may be continued several hours without fear of the foam setting. Likewise, if the foaming operation is continued for about 10 minutes or longer after all the compounding ingredients are incorporated in it and then discontinued, the foam will stand indefinitely without settling out or loss of volume.

In general, about 0.1 to 1.5 parts of oleic acid will be used per 100 parts of rubber in the latex, depending upon the mechanical stability of the rubber. This is equivalent to 2 to 20 drops per 100 grams of latex (60 per cent rubber). Too much of the acid forms a sponge having a frothy or disconnected structure. If too little is used the foam will collapse into a liquid when heated, in the manner that foam containing no oleic acid collapses. The right amount of acid sustains the foam. Agitation of the foam is necessary to reduce the mechanical stability of the latex. It is this together with the action of the oleic acid that causes the latex to set up. Substituting any of the so-called foaming agents, such as soap, glue, casein, etc. in place of oleic acid, the foam will break down and settle out on standing or in vulcanization.

On standing in the beater or in the mold, during the first hour or thereabouts some of the smaller cells of the foam combine to form larger cells. Thereafter the foam undergoes no appreciable change on further standing. The foam is so stable that on heating to cure it, the cells enlarge before communicating, causing an increase in the volume of the sponge, and small openings in the walls of these cells finally occur to permit the air within them to escape. This causes the cells to communicate with one another, and the finished sponge is an open sponge.

It is apparent that latex of too low solids content cannot be used in this manner. It must have a solids content of preferably fifty or sixty per cent or more. The present commercial latices with a solids content of about sixty-two per cent can be used very satisfactorily. The lower the solids content of the latex, the more oleic acid required to sustain the foam.

To cure, more or less of the necessary compounding ingredients, such as zinc oxide, sulfur, accelerator, antioxidant, coloring matter, etc. are added to the latex, and this follows common practice. Ordinarily, an aqueous preparation containing the desired percentages of the desired compounding ingredients will be prepared by ball milling with a suitable dispersing agent. This ball-milled mixture is then stirred into the latex preferably after the foam has been brought to the desired volume. The amount of sulfur and zinc oxide employed will depend upon the accelerator used, as is well known in the art. For example, some accelerators require up to about 3 percent of zinc oxide (based on the weight of the rubber) and some require no more than 1.5 per cent. Usually about 2 per cent is recommended. The zinc oxide serves as an activator. The latex mix will also usually contain 1 to 3 per cent of antioxidant.

The invention contemplates only the production of resilient sponge. Consequently only a limited amount of sulfur is employed, usually about 1 to 2 per cent based on the weight of the rubber. Too much sulfur causes over-curing of the rubber with excessive oxidation which shortens the useful life of the product. The minimum amount of sulfur, zinc oxide and accelerator which will produce a good cure, give the best rubber.

Any accelerator employed in the production of sponge rubber may be used. The accelerator piperidinium pentamethylene dithiocarbamate, known as du Pont accelerator 552 has very little odor and is generally preferred. One-half to one per cent of this accelerator with three per cent of zinc oxide and two per cent of sulfur (each based on the weight of the rubber) has been found satisfactory.

Generally a wetting agent will be employed to disperse the various compounding ingredients in water. The manufacturers of the several ingredients generally recommend how dispersions may be made and these recommendations may be followed. In general soaps are to be avoided because they reduce the tensile of the cured foam, but other dispersing agents may be used. The sulfur, zinc oxide, accelerator and antioxidant, etc. are preferably mixed to form an aqueous master batch which is added to the latex in the desired amount to simultaneously incorporate the several ingredients in it. They are preferably added to the latex after foaming, but may be added before or during foaming without fear of premature gellation. The oleic acid may be added at any stage but generally it is preferable to add it as soon as possible after the foaming operation starts. It is generally advantageous to add all of the other ingredients after the foaming is completed because many ingredients prevent the foam from reaching the desired volume, particularly in a low density foam.

In the prior-art processes which employ a gelling agent, the lighter the foam, the more critical the process, probably because the lighter foam has thinner walls which are quickly acted upon by the gelling agent. Very light foam when treated with a gelling agent sets too quickly for commercial production. Such processes are therefore limited to the production of coarser foams. By using neither foaming agent nor gelling agent, but using oleic acid as a foam-sustaining agent, lighter foams are possible and foams of such low density may be prepared that satisfactory cushions and mattresses are obtained without resorting to coring the molds. For very light foams, it may be necessary to dilute the latex with water or ammonia. Sponges of different densities are obtained, as desired.

At the present time, it is universal practice to use cores in molds designed for mattresses, cushions, etc. The foam obtainable with oleic acid, using no foaming or gelling agent, may be made so much lighter that coring is not necessary. One objection to coring has been that when a cored sponge is removed from the mold, the cores adhere to it due to shrinkage of the foam around the cores, and often the sponge is torn in removing the cores from it. By eliminating the cores this source of difficulty is eliminated, and the number of "seconds" produced is reduced. The cored molds are heavy and cumbersome. Elimination of the cores therefore effects a further saving by making unnecessary the installation of equipment to handle the heavy cored molds. Uncored molds may be so constructed as to be light enough to be handled manually.

Omitting the gelling agent also reduces the amount of "seconds" and waste produced because when a gelling agent is employed, the foam must be poured in the molds at the critical moment. If the foam is allowed to stand too long before pouring, it sets up either in the mixing equipment or during the transfer to the molds. In any event, the action of the gelling agent is so rapid that at times thorough dispersion of the gelling agent in the foam becomes impossible, and the foam then is not of uniform composition and must be discarded or used for the production of an inferior grade of sponge. The foam produced from natural-rubber latex of 60 per cent rubber content, without gelling agent, but containing a small amount of oleic acid, may be stirred at a low speed for two hours or more after all ingredients have been incorporated in it, before pouring into the mold. The cells of the uncured foam enlarge on standing, but there is no breakdown of the cell structure or settling out of the liquid. There is no reduction of volume. A slow stirring will maintain the size of the bubbles or cells until the foam is poured into the molds. This lends itself to maintenance of a continuous body of foam from which to fill the molds.

A material saving in labor costs results. There is no cleaning of mixing equipment in which a batch has gelled. If the operation is made continuous there is no cleaning of the mixing equipment whatever, except at the end of a run.

The foam may be made with nitrogen, carbon dioxide, air, or any suitable gas. The gas may be beaten into the foam with a beater, or it may be introduced through suitable means in the bottom of the foaming equipment, etc. Any mechanical means or process may be used for incorporating the gas into the latex to form and maintain the foam. Sponge of various cell sizes is obtained by allowing the foamed latex to stand for different lengths of time before curing.

The density of the sponge depends in part upon the shrinkage which takes place. This in turn depends on the conditions of cure. If the foamed latex is thoroughly dried and then cured, as by heating for 12 hours at 60° C., there is substantially no shrinkage, the shrinkage being no more than about two per cent in volume. If the same material, without prior drying, is cured 15 minutes at 30 pounds steam pressure it will shrink about ten per cent when dried. If cured in open steam the volume will shrink about five per cent when dried. Curing in a high-frequency electronic field causes an initial slight increase in the volume of the foam in open top molds. (A frequency of 13.5 megacycles is recommended.) The cells communicate under the pressure of the expanding volume of gas within them and the volume of the foam shrinks to its original size. The foam should not be heated too rapidly until this has taken place. After the cells communicate the foam may be cured rapidly. It may be transferred to other heating means at this point. No further change in volume occurs until after it is removed from the mold and dried.

For the foam-sustaining agent I prefer to employ oleic acid. It appears that fatty acids such as stearic, acid, palmitic acid, etc. have an equivalent action if used in considerably larger amounts.

*Production of sponges of different properties*

Two master-batch emulsions of compounding ingredients were prepared and using these several identical latex mixes were produced. These were subjected to different treatments to produce sponges of different properties.

The masterbatches were prepared as follows:

MASTERBATCH A

| | Parts by weight |
|---|---|
| Water at 180° F. | 20 |
| Darvan No. 1 (sodium salt of polymerized alkyl-aryl sulfonic acids) | 2 |
| duPont accelerator 552 | 2 |
| Sulfur | 6 |
| Zinc oxide | 9 |
| AgeRite white (di-beta-naphthyl-para-phenylenediamine) | 2 |

These ingredients were ball milled for 24 hours.

MASTERBATCH Z

| | Parts by weight |
|---|---|
| Water | 45.1 |
| Darvan No. 1 (sodium salt of polymerized alkyl-aryl sulfonic acids) | 2.1 |
| Caustic soda | 0.3 |
| Casein | 2.5 |
| Beta naphthol | .1 |
| Butyl zimate (zinc dibutyl dithiocarbamate) | 50.0 |

These ingredients were ball milled for 24 hours.

The foam was prepared in a Hobart Type A-200 twenty-quart mixer having Hobart air discs in the bottom of the mixing bowl. The No. 1 speed of the mixer was low speed, and No. 2 was medium speed. Compressed air at a very low pressure was used to force bubbles into the latex while mixing. The temperature of the room and all ingredients was 75° F.

The natural-rubber latex used had a solids content of 62 per cent, ammonia content of 0.5, pH of 9.5, and mechanical stability of 150 seconds.

Two thousand grams of the latex were put in the mixing bowl. One hundred grams of water, 50 grams of 26% ammonia and 6 cc. of oleic acid were incorporated in the latex while stirring at No. 1 speed.

The air was turned on and the whipping continued for 2 minutes until the foam while at rest was 4 inches from the top of the bowl. The air was turned off. Then while stirring at No. 2 speed, 200 grams of Masterbatch A and 5 grams of Masterbatch Z were added. Stirring was continued for 5 minutes at No. 2 speed and then at No. 1 speed for 10 minutes. The foam was poured into an open top 16 gauge aluminum mold measuring 13½ by 13½ by 4½ inches.

Several identical batches were prepared in this way, and each was subjected to a different subsequent treatment and then vulcanized in open steam at 212° F., as follows.

Batch:
  A—The mix was placed in the vulcanizer immediately after putting into the mold.
  B—The mix was allowed to stand in the mold 15 minutes before placing in the vulcanizer.
  C—The mix was allowed to stand in the mold 30 minutes before placing in the vulcanizer.
  D—The mix was allowed to stand in the mold 60 minutes before placing in the vulcanizer.
  E—Several mixes were allowed to stand in the mold various lengths of time from 6 hours up to 6 days before vulcanizing.

The following table records the character of the cured sponge:

| Batch | Cell Size, mm. | Indentation, p. s. i. |
|---|---|---|
| A | 0.5 | 0.42 |
| B | 1.0 | 0.57 |
| C | 2 | 0.65 |
| D | 4 | 0.90 |

In all of the E mixes the cell size and indentation were substantially the same as for D mix.

The table shows that the cell size and resultant increase in cellular wall thickness materially affect the indentation. All of the above pieces of sponge had substantially the same weight and volume (within tolerance limits).

The indicated mixing time and speed are the minimum optimum with this equipment for this formula. Any substantial reduction in the mixing time gave an unsatisfactory sponge. However, the mixing time has been increased up to 2 hours at No. 1 speed without any noticeable change in the foam, and batches so mixed could then be poured and allowed to stand without agitation prior to vulcanization with the results indicated in the above table.

Compared to foamed-latex sponges produced by other processes, the sponges made using oleic acid as a foam-sustaining agent have a higher indentation for a given weight and volume, and equal indentation for less weight with the same volume. This is true regardless of the accelerator or other compounding ingredients employed and regardless of the sponge density.

It may at times be desirable to use a gelling agent to set foam which contains oleic acid as a foam-sustaining agent. In the foregoing examples which illustrate the use of oleic acid as a foam-sustaining agent, a gelling agent might be used. It is not necessary to use as much gelling agent as would be used in the absence of oleic acid, generally only about one-fifth as much being satisfactory. By using oleic acid with a gelling agent, the whipping time may be extended up to three or four times as long as in the prior art methods without fear of premature coagulation, thereby making the mix less critical. In such a procedure it is desirable to add the gelling agent to the foam after all of the other ingredients have been incorporated in it. For example, in the foregoing examples, in which Masterbatch A and Masterbatch Z were added to foamed latex, and the mix was stirred at medium speed for five minutes and then at low speed for ten minutes, 20 grams of 50 per cent aqueous ammonium nitrate or sulfate may be added to gel the foam. Said low speed stirring may be reduced to five minutes or prolonged to two hours, the gelling agent then being added, and the stirring continued five or ten minutes after the gelling agent is added before pouring into the mold. This provides thorough mixing and gives ample time after addition of the gelling agent, for pouring the foam into the mold. The gelling time of this mix will be decreased slightly at room temperature and decreased materially when heat is applied for gelling purposes. The shrinkage will be somewhat greater than when no gelling agent is used and will increase with the addition of greater amounts of gelling agent, but this may be compensated for in the original mold size. The size of the cells in the finished sponge and the cell-wall thickness will be decreased according to the reduction in gelling time before vulcanization. The identation will vary with the cell size and cell-wall thickness.

INCORPORATING OIL INTO LATEX; USES THEREOF

Mineral oil may be incorporated in a natural or synthetic latex in an amount of 25 per cent and more of the weight of the rubber by adding several per cent of oleic acid to the latex or the oil. For instance, white oil may thus be incorporated in natural-rubber latex. The oil dissolves into the rubber particles in the latex. The water content of the resulting mix is not increased; the per cent of water in the mix is decreased. Upward of two hundred per cent of oil (based on the weight of the rubber) may thus be introduced into the latex, producing a latex of low water content. This latex may be used for molding; it may be foamed and cured to produce sponge, etc. Because of its lowered water content it shrinks less on drying, than the same latex to which no oil has been added. Organic or inorganic matter may be mixed into the oil without adding water, and be thus incorporated in the rubber product.

Paraffin-base mineral oils are better suited for such use than naphthene-base mineral oils. The oleic acid is preferably added directly to the oil but might be separately added to the latex. About 1 to 5 parts of oleic acid is used per 100 parts of the oil. Using more oleic acid than required is not harmful, but it is expensive. The oil to which the oleic acid has been added may be stored indefinitely awaiting use.

By adding unemulsified oil to latex, latex of low water content is obtained. Thus, adding different amounts of white oil to natural-rubber latex containing 60 parts by weight of rubber, one obtains latices as follows:

| Starting Latex | | Added Oil, parts | Final Latex | |
|---|---|---|---|---|
| Rubber, parts | Water, parts | | Oil and Rubber, parts | Water, parts |
| 60 | 40 | 15 | 66 | 34 |
| 60 | 40 | 30 | 70 | 30 |
| 60 | 40 | 60 | 75 | 25 |
| 60 | 40 | 120 | 82 | 18 |

If the same amount of oil be added as a 50-50 oil-water emulsion, the water content of the final latex is much higher, as follows:

| Starting Latex | | Added Emulsion | | Final Latex | |
|---|---|---|---|---|---|
| Rubber, parts | Water, parts | Oil, parts | Water, parts | Oil and Rubber, parts | Water, parts |
| 60 | 40 | 15 | 15 | 58 | 42 |
| 60 | 40 | 30 | 30 | 56 | 44 |
| 60 | 40 | 60 | 60 | 55 | 45 |
| 60 | 40 | 120 | 120 | 53 | 47 |

By incorporating the oil in the latex directly without first emulsifying it, it is possible to produce a latex that contains as much oil as rubber and no more than 25 per cent by weight of water. This latex contains also 1 to 5 per cent oleic acid (based on the weight of the oil). Such latices may be used in a novel manner to produce desirable products which because of their oil content are cheaper than products containing no oil.

The rubber particles in natural-rubber latex are spherical, average one micron in size, are negatively charged, and are in constant motion (Brownian movement) in the continuous water phase of the latex. When a film of latex is deposited on any surface and the water present is reduced sufficiently by evaporation or the like, the rubber particles touch, the Brownian movement is arrested, and the rubber particles coalesce.

Different theories have been advanced to explain what occurs when a gelling or coagulating agent is incorporated in latex. It is generally believed that the electric charge is reversed. Whatever the cause, the rubber particles touch and become bonded together, squeezing out the water into the interstices between the rubber particles.

When oil is added to latex, as herein contemplated, the oil is dissolved into the rubber particles and if sufficient oil is added the rubber particles swell until they touch and become bonded together causing the latex to become set. For example, adding 100 per cent of white oil (based on the weight of the rubber) to 100 parts of rubber (as 60 per cent latex)—as in line 3 of the first of the above two tables—using, for example, 1 per cent oleic acid (based on the weight of the oil) added to the oil—the rubber particles swell until they double in volume. Such swelling does not affect the volume of the latex. The amount the particles must swell before touching, depends upon the water content of the latex. If the rubber is to be cured, vulcanizing ingredients must be added to the latex, and they are customarily incorporated as a 50 per cent water dispersion. This adds about 5 parts of water to the latex. This latex may be set up by swelling of the rubber particles with oil until they coalesce. There is no shrinkage of this product until the rubber is dried and even then the shrinkage is slight, of the order of several per cent.

The rate at which the rubber particles swell depends upon the temperature of the latex. Raising the temperature accelerates the swelling. When relatively small amounts of oil are used a gelling against may be used to reduce the time required to set the latex.

Such a latex which sets up and may be cured with only slight shrinkage has many applications, both in the production of solid rubber products and sponge rubbers. The swelling of the rubber particles until they touch and coalesce causes them to retain their shape, and foams may be produced from such latices without the aid of foaming or gelling agents. A cured sponge made from such a latex may be swollen by oil as is described more particularly below. Sponge made from latex which contains no oil will dissolve only a certain amount of oil. For example, natural-rubber sponge will dissolve only about 100 per cent of its weight of white oil. If the sponge is made from latex which contains oil, the sponge will dissolve an additional amount of oil equal in weight to the amount of oil in the sponge. For example, a sponge made from natural-rubber latex which contains 100 per cent of white oil (based on the weight of the rubber in the latex) will dissolve an extra 100 per cent of white oil after curing. Furthermore, the solution of such added oil is not dependent upon the sponge being made without a gelling agent. The latex need not contain enough oil to cause the rubber particles to swell until they touch; it may contain too much aqueous phase to permit touching. Thus, a natural-rubber latex which contains only 5 per cent of oil (based on the weight of the rubber), foamed and then set by a gelling agent, and thereafter cured, yields a sponge which dissolves an added 5 per cent of white oil (based on the weight of the rubber) compared to a sponge made from the same latex to which no oil has been added.

To the best of my knowledge and belief the prior-art formulae involving incorporation of unemulsified mineral oil into latex before foaming for the production of sponge, utilize no more than about ten or fifteen parts of oil based on the weight of the rubber. The oil is used because of its effect on the properties of the sponge rather than to cheapen the sponge product. No one has known how to incorporate as much as twenty-five or fifty per cent or more of mineral oil into latex to cheapen the resulting sponge.

Although animal and vegetable oils and other mineral oils than white oil may be incorporated into latex, according to this invention, and may be used in sufficient amount to cause the rubber particles to swell until they touch, and thereby produce foams, etc. which set without the use of a gelling agent, and are thus equivalent to white oil, I prefer to use white oil.

Oils occurring in nature, such as tea seed oil, corn oil, olive oil, cottonseed oil, lard oil, and other animal and vegetable oils may generally be incorporated into the latex in amounts in excess of 25 per cent (based on the weight of the rubber) without adding oleic acid, probably because of the presence in the oil of free oleic acid or other fatty acid which has an effect equivalent to that of oleic acid (although it may be necessary to use such other fatty acid in an amount in excess of the required amount of oleic acid). If the acid content of the oil is too high, a protective colloid is added to the latex to prevent coagulation. Mineral oils are preferred to animal and vegetable oils not only because of their low cost, but also because they do not turn rancid.

*Compounding latex containing oil*

The latex may be compounded for vulcanization according to any usual formula for the curing of latex, using any accelerator, antioxidant, etc. commonly used for that purpose, in any amount commonly employed. Activators, mineral fillers, coloring matter, etc. may be used as desired. A formula illustrative of the invention involves ball milling for twelve hours the following ingredients:

COMPOUNDING FORMULA I

| | Grams |
|---|---|
| Water at 180° F | 600 |
| Darvan #1 | 7.5 |
| Du Pont 552 accelerator | 60 |
| Fine grain sulfur | 240 |
| Zinc oxide | 300 |
| AgeRite Alba (Hydroquinone monobenzylether) | 60 |

This ball-milled mixture of compounding ingredients is used in various of the formulae which follow.

For example, 300 cc. of white oil containing 3 cc. of oleic acid is added to 500 grams of natural-rubber latex (60 per cent rubber content). Then 50 grams of the emulsion of Compounding Formula I is mixed with the latex. If cooled to 50° F. this latex will remain pourable and otherwise usable for an hour after mixing. If poured onto a hot plate, it sets almost immediately.

The mix is cured on heating to 165 F. for three hours.

Various accelerators may be substituted for that given in the above formula, the other ingredients remaining the same. Such accelerators include, for example, zenite (90 per cent zinc salt of 2-mercaptobenzothiazole and 10 per cent hydrocarbon wax), methyl or ethyl zimate (zinc dimethyl or diethyl dithiocarbamate), etc.

Other formulas may be used for curing, as is well-known in the art. The following is illustrative.

COMPOUNDING FORMULA II

| | Parts by weight |
|---|---|
| Rubber (60% latex) | 100 |
| Potassium hydroxide | 0.5 |
| Zinc oxide | 3 |
| Sulfur | 1 |
| AgeRite white | 1 |
| Butyl zimate, ethyl zimate or methyl zimate | 1 |

Butyl zimate is zinc dibutyl dithiocarbamate. All of the compounding ingredients of Compounding Formula II are added to an equal weight of water. The potassium hydroxide dissolves and serves as a dispersing agent for the other ingredients. The dispersion is added to the latex to which 25 to 200 parts by weight or more of white oil (containing 2 per cent of oleic acid) has been added. The oil is added after foaming. The mixture is foamed and cured 1 hour at 212° F.

*Forming latex containing oil*

The latex containing oil has many uses. It may be cast, spread, extruded and molded, etc. The latex may be given body by adding whiting, powdered flint, clay, etc. to the oil in an amount up to several hundred per cent (based on the weight of the rubber), before incorporating the oil into the latex.

Because of its low shrinkage such latex of low water content may be used for the production of articles with fine surface markings. It may be used for the production of models and molds, etc. After curing models or molds of the latex, plaster, cement, resins, etc. may be cast into or around them. The sulfur content of molds or models, etc. which are to be used for forming alkyd resins and the like should be kept at a minimum to minimize the effect of the sulfur on the resin. For example, the latex might be compounded with butyl zimate and as little as one per cent of sulfur, together with other compounding ingredients known in the art, as required.

By keeping such rubber molds moist when not in use, shrinkage of the molds and models can be kept to not over about 0.1 per cent if made from a latex which contains, for example, 100 per cent of oil (based on the weight of the rubber). Slight undercuts in such a mold or model are not objectionable because of the flexibility of the rubber from which they are made.

The compounded latex has been used for covering a rubber roller. A roller 38 inches long, with flanged ends 7 inches in diameter, and having a core diameter of 5 inches between the two flanges was thus coated. Two per cent by weight of oleic acid was added to 60 parts by weight of white oil. This was mixed with 200 parts by weight of natural-rubber latex (60 per cent rubber content) having a pH of about 9.5. Twenty parts by weight of the ball-milled mixture of compounding ingredients of Compounding Formula I was mixed into it with stirring for about three minutes. Three hundred cubic centimeters of 50 per cent ammonium nitrate was then added. Care was taken to incorporate no air in the latex. The core of the roller was covered with a one inch coating of this latex mix, filling it flush with the flanges. The latex gelled in about 30 minutes at room temperature. The whole was heated to 165° F. for three hours to cure the rubber. The rubber covering was dried and was then ready for use. There was no appreciable shrinkage of this rubber during curing or drying.

A doll model was similarly made in a two-part mold.

*Production of sponge from latex containing oil*

To produce a foam, 500 grams of natural-rubber latex (60 per cent rubber content) were foamed by whipping or the like until they occupied a volume of 1650 cc. A foam of small bubble size was obtained by slowly turning a beater through a foam of larger sized bubbles. Three hundred cubic centimeters of white oil containing 3 cc. of oleic acid was beaten into the latex foam with slow agitation, over a period of about 30 seconds. Then 50 grams of the above Compounding Formula I were added, with slow agitation, over the next two or three minutes.

The foamed latex was poured into a doll mold containing an articulated skeleton with projections extending into the hand and foot portions of the mold.

The mold should not be colder than the mix. It may be ten to twenty degrees higher. The mold, skeleton and the foam may all be at the same temperature. This may be room temperature or thereabout. Immediately after filling the mold was heated in steam at 212° F. at atmospheric pressure for one hour to cure. After curing, the mold was opened and the sponge was washed and dried. No appreciable distortion of the rubber caused by shrinkage over the skeleton was discernible.

The surface of the doll was as smooth as the surface of the mold, and perfect in every detail. The sponge cells enlarged only slightly during the cure. The skin was smooth and felt quite like human flesh. It could be flexed and compressed, and the folds and wrinkles made by so doing were very life like.

If the foam is allowed to stand in the mold at room temperature the swelling of the rubber particles will cause it to set to an irreversible gel in about twenty minutes. Heating hastens the setting of the gel, and the sooner the gel sets the smaller the air cells in the sponge. If the mold is subjected to cure immediately after filling, the cells enlarge very little. When heated for curing, there is a slight increase in the volume of the sponge, and the excess foam escapes through the vent holes provided in the mold. There is no shrinkage of the foamed latex or sponge in the mold thereafter and the surface of the sponge does not draw away from the surface of the mold.

If a gelling agent is added to the above mix it will ordinarily cause the foam to gel before the swelling action of the oil has been completed. On curing, the foam will shrink away from the mold surface and a large portion of the skin will be loose and separated from the body of the sponge. The rubber will be distorted due to shrinkage over the hand and foot members of the skeleton. A protective colloid might be used to counteract the effect of the gelling agent, but then the one offsets the other and both are useless and undesirable.

The product has good tensile, almost as high as that of sponge which contains no oil. It has materially better elongation than a sponge of rubber unmixed with oil and better body and indentation. Increasing the oil content of the rubber causes a drop in the tensile strength of the sponge, proportionate to the amount of oil used. Its body and indentation are satisfactory and even desirable for many uses, including the manufacture of backing or underlay for carpets and rugs, cushions, anatomical specimens, toys, etc.

As much as 500 per cent of white oil has been satisfactorily incorporated in latex of natural rubber for the production of sponge. As little as 10 per cent will cause the foam to set if the foam is heated, provided the mixing is prolonged to provide friction to aid in the coagulation. A foaming agent or protective colloid used with small amounts of oil retards or prevents the setting of the foamed latex.

At room temperature, natural-rubber latex of about 62 per cent rubber content to which has been added 100 parts by weight of white oil (containing 2 parts of oleic acid) per 100 parts of the rubber, will gel in about 20 minutes. Adding only 75 parts of white oil will prolong the gelling time to 30 or 35 minutes. With only 50 parts of oil, it will take one hour to gel. Two hours will be required if only 25 parts of oil are added. If only 15 parts of oil are added to the latex it will take about 24 hours to gel. The gelling time is dependent on the water content of the latex, the lower the water content the shorter the gelling time. It also varies somewhat from latex to latex, so the above are only approximations. With a standardized latex the behavior can be accurately predicted. Raising the temperature shortens the gelling time. At 100° F., if 100 parts of oil are added to 100 parts of natural-rubber latex, the latex mixture will gel almost instantaneously, and if 20 parts of oil are added it will take about 20 minutes to gel. At 70° F., if as much as 500 parts of oil are added to natural-rubber latex, a little soap, casein, or other protective colloid is advantageously added to delay gelling until the foam can be poured. At 35° F., 500 parts of oil can be added satisfactorily without using any casein or soap. In operating on a commercial scale with large bulks of the foam which require minutes to pour, the temperature of the room and materials is advantageously lowered to delay gelling.

A backing or underlay for carpets and rugs may be made of foamed latex sponge which contains several hundred per cent of oil. The following formulae are illustrative:

CARPET UNDERLAY NO. 1

This formula is to be carried out with the ingredients, the room and the equipment at about 70° F.

Three ounces of 26 per cent ammonia and 10 cc. of oleic acid are added to 100 ounces of natural-rubber latex (60 per cent rubber content). This is whipped to 3.5 gallons of foam by any suitable beater. Then with slow agitation of the foam, 60 ounces of white oil containing 23 cc. of oleic acid are poured through a fine sieve into it, over a period of about one minute. Slow agitation is continued for about five minutes until the oil has been thoroughly mixed into the latex. With continued slow agitation 10 ounces of the ball-milled ingredients of Compounding Formula I are added during about three minutes. The foam is spread on a 36-inch wide belt which is slowly moved under a doctor knife which produces a sheet of foam ¼ inch thick. On drying this produces a sheet having an area of about two square yards. The belt is run into a steam chamber at 212° F., atmospheric pressure, where it is cured for 40 minutes. The sponge sheet is washed and dried, and is then ready for use as an underlay to be placed under carpets or rugs.

CARPET UNDERLAY NO. 2

One hundred parts by weight of white oil containing about 1.25 parts by weight of oleic acid is added to latex of natural rubber of 60 per cent solids content, containing 100 parts by weight of rubber. After or during foaming there is added 10 parts of Compounding Formula I. The latex is foamed by incorporating sufficient air to produce a cured product that weighs four pounds per square yard. This foam is spread into a sheet ¼ inch thick. This may be done by casting the foam onto a moving belt or the like and leveling it off by a doctor knife. The belt passes into a steam chamber where the cast sheet is heated at 212° F. for thirty minutes. The sponge is then washed and dried, and is ready for use an an underlay for carpets and rugs.

Alternatively, either of the sponge sheets of the above formulae may be cured in hot air. Any curing conditions may be used compatible with the accelerator, etc. employed. The curing time may be shortened to a few minutes by curing in a high-frequency electronic field.

The cured sheet has the compressive deflection which gives excellent cushioning properties for an underlay for carpets, rugs, etc. Even when deflected to its substantial compressible limits the additional body given to the rubber incident to the oil, still produces a very marked cushioning effect. The rubber backing does not support moths or vermin of any kind and even discourages them from attacking the carpet.

When oil is incorporated in latex it swells the individual rubber particles and becomes an integral part thereof. Prolonged washing of the eventual cured sponge in carbon tetrachloride removes only a small fraction of the oil. The cured sponge will not smear glass or stain the most absorbent paper or fabric even when more than one hundred parts of oil is added to one hundred parts of rubber (as latex). Five to 500 or more parts by weight of mineral oil per 100 parts of rubber, yield such a product. Over 500 parts of the oil may be incorporated but the product is of poor quality, having too low tensile for carpet underlay.

Greater or lesser amounts of air may be incorporated in the foam to give a sponge of any desired weight and specific gravity, although it is quite difficult to make a very light weight sponge with any appreciable amount of oil without the use of a protective colloid.

A sheet of sponge having increased cushioning properties may be made from foamed latex to which oil has been added, which sheet is superior to other rubber sponges for upholstering chairs, furniture, etc.

The same general formulae for latex to which unemulsified oil has been added in amounts of 25 per cent (based on the weight of the rubber) and more, such as 50 per cent, 100 per cent, 150 per cent, 200 per cent, 500 per cent, etc., and modifications of such formulae using such amounts of oil, may be used in (a) foamed latex for the production of sponge and chemically blown latex sponge, which sponges may or may not have additional oil dissolved into them after curing as hereinafter described, (b) in latex for forming a solid mass of rubber, etc.

SWELLING SPONGE BY DISSOLVING OIL INTO IT

Oils cause rubber vulcanizates to swell. Different oils give the vulcanizates different properties. Some odoriferous oils will render the product objectionable for certain purposes. Animal and vegetable oils impart desirable properties, although they are relatively expensive and become rancid on aging. Products containing them do not remain flexible at the low temperatures, sponges containing mineral oils remain flexible. Mineral oils produce products more or less desirable depending upon whether or not the oil is free from odor, etc. All such oils may be dissolved in large amount into natural rubber sponges without leaving any trace of oiliness in the product. The oil may be introduced as an emulsion but is preferably added in a water-free condition.

Oils occurring in nature, such as tea seed oil, corn oil, olive oil, cottonseed oil, oil of sesame, lard oil, etc. may be used although I prefer white oil. Fatty acids such as oleic acid, etc. may be used instead of oil. Melted paraffin and other oil equivalents may be used but generally their cost is relatively high and materials such as melted paraffin can be handled only with difficulty on a commercial scale. Resins and the like which are soluble in the rubber may be dissolved in the oil and transferred by it to the rubber and thus become incorporated in the rubber to improve its properties. Solution of mineral oil into the rubber may be facilitated by adding several per cent, for example, one to three per cent, of oleic acid to the oil.

The absorption of the oil into the sponge, whether a foamed-latex sponge or a chemical sponge, causes the sponge to swell and generally this has been avoided as undesirable. I have found that such swelling of the sponge may be utilized to impart valuable properties to the sponge and materially reduce its cost.

All sponges which have intercommunicating cells may be swelled except those with continuous rubber films extending over both surfaces. A film over one surface, if thin, is not objectionable. If thicker than the cell walls, the film will not take up the oil as rapidly as the cell walls and the swollen product will be distorted. A sponge with no film covering and having cell walls of substantially uniform thickness is preferred because all parts of such sponge will absorb the oil at the same rate, resulting in substantially uniform increase in the volume of the product.

The sponge is preferably made from natural rubber but synthetic rubber such as GR-S (rubber-like copolymer of 1,3-butadiene and styrene), etc. may be used. A sponge of foamed natural-rubber latex prepared without any foaming or gelling agent, but containing a foam-sustaining agent such as oleic acid, as above described, makes an excellent starting material. The cells of such a sponge are large, round, and of relatively uniform size, and the rate of oil absorption is relatively the same throughout the product. Such sponge has superior indentation values and tensile strengths after swelling, as well as before.

Although the invention contemplates the addition of any soluble oil to any foamed-latex or chemical sponge, whether made of natural rubber or other rubber-like materials, it relates more particularly to the addition of white oil to natural-rubber sponge, and particularly sponge which is not fully cured. A sponge, whether a foamed-latex or chemical sponge, which is almost completely cured but which after compression resumes its ordinary sponge structure somewhat more slowly than a fully cured sponge, gives a better product after the addition of oil than the fully cured sponge. A sponge which has been cured only about 90 per cent of the time required to give a maximum cure, after swelling has a better tensile and otherwise improved properties, than a sponge which has been fully cured. Although its permanent set before swelling is excessive, after it is swelled with 25 or 50 per cent or more of white oil, for example, its permanent set is excellent and it ages well. Its compression deflection is greater than that of a fully cured sponge similarly swelled.

The amount of oil which can be incorporated into a sponge rubber can be increased by incorporating oil into the rubber before curing, as by adding mineral oil to latex of natural rubber and then foaming it. Thus cured sponge prepared from latex of natural rubber which contains no oil will dissolve a maximum of about 100 parts by weight of white oil. A few rubber sponges containing no oil have been found to dissolve in excess of 100 per cent of oil without becoming oily. If white oil is added to the latex from which the foam is produced, the cured sponge will still take up additional white oil. It is thus easily possible to add several hundred parts by weight of oil to the rubber. The following table is illustrative, the figures representing parts by weight.

| Rubber, parts | Oil Added Before Curing, parts | Oil Added to Cured Sponge, parts | Total Oil in Product, parts |
|---|---|---|---|
| 100 | 0 | 100 | 100 |
| 100 | 15 | 115 | 130 |
| 100 | 100 | 200 | 300 |
| 100 | 150 | 250 | 400 |
| 100 | 200 | 300 | 500 |

In each instance, the maximum amount of oil that can be dissolved into the cured sponge is equal to the weight of the cured sponge, i. e., the sum of the first two columns (the weight of the rubber plus the weight of the oil incorporated in the foam before curing). The total oil in the final product is the sum of the two middle columns. Sponge which contains over 500 parts of oil is quite mushy and has poor physical properties for most uses.

The oil dissolved into the sponge becomes an integral part of the sponge product. It cannot be removed, even by washing in boiling water. It can only be removed with an oil solvent. Oil incorporated in the rubber before vulcanization is quite difficult to remove even with a solvent.

As oil is dissolved into the cured sponge it increases in volume. Twenty to fifty parts of oil is taken up in only a few minutes. The time required depends upon whether an excess of oil is maintained constantly in contact with the cell walls for solution therein, the temperature, etc. Increase in temperature speeds up the solution. The sponge swells more or les depending upon the amount of oil dissolved into it. Solution of 100 parts by weight of white oil into a cured natural rubber sponge approximately doubles its volume. The sponge increases in size about 25 per cent in each direction. This is generally true regardless of whether the sponge contains only rubber or whether the latex from which the sponge is made has had oil added to it before curing, and whether the sponge is a chemical sponge or foamed latex sponge.

The oil dissolved into the sponge after the sponge has been cured is present in an uncured condition. This reduces the tensile strength of the rubber. If a large amount of oil is to be dissolved into the sponge, a sponge of high tensile strength will ordinarily be used.

The sponge made according to the above formula for Carpet Underlay No. 2 contains 100 parts of white oil per 100 parts of rubber. A piece of this sponge 10 inches by 10 inches square and $\frac{3}{16}$ inch thick, weighing 105 grams was swelled with 105 grams of white oil. After swelling this piece measured 12½ inches by 12½ inches square and ¼ inch thick. Its weight was doubled and its volume was substantially doubled. The final product under actual test has proven satisfactory for carpet underlay. It has splendid elongation and indentation. The tensile strength is adequate for the purpose.

In swelling a sponge there is preferably absorbed uniformly throughout it, an amount of oil less than the amount that can be dissolved into the sponge under the conditions of temperature, etc. under which the process is carried out. All of this oil is then dissolved into the walls of the sponge. The surface of the resulting sponge is free of any oil. It will not smear glass, linen, paper, etc.

This is preferably done by controlled compression and expansion of the sponge, as by compressing the sponge, allowing it to expand while immersed in the oil, and then removing any excess oil absorbed by the sponge before the dissolving of this oil into the sponge is completed. No satisfactory method has been devised for removing any undissolved excess of oil from the sponge after the sponge has dissolved all the oil it is capable of dissolving.

In my first experiments, the oil was incorporated into the sponge from an emulsion. This was not satisfactory until the operation was conducted on a batch basis using in each operation an emulsion containing only the amount of oil which it was desired to dissolve into the sponge, and then dissolving all of this oil into the sponge. Equipment for such an operation is illustrated in Figs. 1 and 2.

The vessel 31 may be, for example, eighteen inches square. The sponge 32 which is to be treated in the vessel, is one foot square. This allows ample room for the sponge to swell laterally as it takes up the oil. An inch off of the bottom of the vessel is the perforated screen 33. The head of the plunger plate 34 is perforated. Any suitable means (not shown) is provided for reciprocating the plunger head in the vessel. The use of screen to hold the sponge off the bottom of the vessel 31 is optional.

In using this equipment, sufficient emulsion is employed to cover the sponge in its uncompressed air-free condition. The plunger is lowered into the vessel to compress the sponge and drive all air out from it. On lifting the plunger head the emulsion is absorbed by the sponge and the oil is incorporated uniformly throughout the sponge. In order to get uniform solution of the oil into the sponge the plunger will be lowered and raised several times in the course of a minute or two, depending upon the thickness of the sponge. This causes uniform distribution of the oil globules of the emulsion throughout the sponge with resultant uniform solution of the oil from the emulsion into the walls of the cells.

On solution of all of the oil into the sponge, the water remains in the sponge and after standing a half an hour or so (or whatever time is required for all of the oil to dissolve into the sponge) the water may be expelled by compressing or centrifuging the sponge. The operation is satisfactorily carried out at room temperature. The sponge may be washed if desired, but this is unnecessary. The total amount of oil in the emulsion does not exceed that which is dissolved into the sponge so there is no undissolved oil left on the surface of the sponge to give it an oily feel.

To produce the emulsion, several per cent of any suitable emulsifier, e. g.: three or four per cent, may be employed. Oleic acid is soluble in rubber and is, in general, preferred. The emulsifier known as Emulfor, made by General Dyestuffs Corporation, has been used with satisfactory results. The water may be warmed to facilitate emulsification and to accelerate the solution of the oil into the rubber.

There are distinct advantages in using an unemulsified oil. The apparatus such as shown in Figs. 1 and 2 may be used. Apparatus capable of continuous operation is preferred in which the sponge first passes through a zone in which the required amount of oil is absorbed and uniformly distributed into the sponge, and then through a zone in which the absorbed oil is dissolved into the sponge. In the first zone the required amount of oil is incorporated in the sponge without excess as any excess is removed before the sponge passes into the second zone. Apparatus for carrying out such a process is illustrated in Figs. 3 and 4. This may be used for treating individual sheets as well as for treating a continuous sheet, as illustrated.

In Figs. 3 and 4, 1 is a continuous sheet of natural-rubber sponge or other sponge. It may be chemical sponge, but is preferably foamed-latex sponge which may or may not contain oil which has been added to the latex before curing. The sponge is fed on to the screen belt 2 and carried on it down into the while oil or other oil, etc. contained in tank 3. Rollers 4 and 5 (carrying screen belts 6 and 2) compress the sponge and remove the air from it. The sponge is carried out of the oil bath between these belts, and as it expands in contact with the oil it absorbs oil from the bath. As the sponge is carried on through the equipment it is passed through the rollers 7 and 8 which squeeze the excess oil from it. This excess is returned to the tank 3. The sponge then passes between the pairs of rollers 9 and 10, 11 and 12, 13 and 14, and 15 and 16 and is thereby compressed and allowed to expand several times in quick succession. This kneading of the sponge distributes the remaining oil uniformly throughout the sponge. The sponge dissolves the oil rapidly and as it does so it swells appreciably. The kneading needn't necessarily be continued throughout the swelling, but should be repeated enough to insure uniform distribution of the oil throughout the sponge. The belt 17 carries the sponge 18 from the equipment, and the sponge may be carried over a festoon or other equipment to afford an opportunity for all of the incorporated oil to be dissolved into the rubber. Apron 19 returns the excess oil to the tank.

The level 20 of the oil in the tank is such that the entering sponge is somewhat compressed before it contacts the oil. The oil is so rapidly dissolved into the sponge that in order to get uniform solution of the oil into the rubber it is necessary to distribute the oil in the sponge without delay. In the apparatus shown the sponge is expanded while immersed in the oil, almost immediately after contacting the oil, and this effects uniform distribution of the oil in the sponge with resultant uniform swelling of the sponge by the oil.

Each roller of the pairs 9 and 10, 11 and 12, 13 and 14, and 15 and 16 may be rubber covered, preferably with a rubber not affected by the oil. The rollers may be pressed together by any suitable means such as springs 21 (shown in Fig. 4) located at each side of the equipment.

This equipment is adapted for the treatment of sheets of great length or individual pieces of any size. The sponge may be cored, but if the latex is foamed by the oleic acid process herein described will preferably not be cored, and may be of any thickness from a small fraction of an inch for underlay for carpets and rugs, etc., up to several inches for cushions, mattresses, etc.

With such equipment as illustrated in Figs. 3 and 4, the amount of oil ultimately dissolved into the rubber depends upon the tension on the squeezing rollers (which controls the amount of oil remaining in the sponge), the thickness of the walls of the cells of the sponge (which controls the speed at which increasing amounts of oil are dissolved into the sponge), the temperature (which controls the rate of solution of the oil into rubber before the excess is removed by squeezing), the speed of the machine (which controls the amount of oil dissolved into the rubber before the excess is removed by squeezing), and probably the degree of vulcanization of the sponge. The amount of oil finally dissolved into the rubber may be varied by changing any of these variables. Thus with any given sponge and oil, the amount of oil dissolved into the rubber may be controlled by changing the speed of the apparatus. For instance, with a certain machine, operated so that it took five seconds for the sponge to pass from rollers 4 and 5 to rollers 15 and 16, the final sponge contained 10 per cent of oil (based on the original weight of the sponge). Reducing the speed so that it took 25 seconds and 50 seconds for the sponge to travel this distance, the final sponge contained 50 and 100 per cent, respectively, of oil (based on the weight of the sponge).

If the sponge is allowed to remain in the oil too long, or if too long a time elapses before the excess oil is removed from the sponge, there is undissolved oil left in the sponge when the sponge has dissolved all the oil it is capable of dissolving, and a film of undissolved oil remains on the cell walls of the final product giving it an oily feel. This is avoided by incorporating no more oil in the sponge than will dissolve in the rubber, and then allowing all of the incorporated oil to dissolve into the rubber.

In a batch operation, e. g., an operation in which a small piece of sponge is squeezed manually after dipping in oil or an oil emulsion, any given amount of oil may be dissolved into the sponge (up to the maximum the rubber will dissolve) by repeatedly dipping the sponge into the oil or emulsion, and then squeezing the sponge and allowing the rubber to dissolve the incorporated oil. Any process may be used in which the required amount of oil is incorporated in the sponge and solution into the sponge is completed in the absence of excess oil.

In swelling natural-rubber sponge with white oil, the increase in the volume of the sponge is directly proportional to the amount of oil dissolved into the cured sponge, and this is true regardless of the amount of oil incorporated in the sponge before curing. Thus, incorporation of its own weight of oil doubles the volume, etc.

The sponge obtained by curing foamed latex, contains water. This sponge is dried, usually after washing. The drying is expensive. The sponge may be swollen with oil before drying, and this is particularly desirable if the oil is to be dissolved from an emulsion, because after dissolving oil from the emulsion the sponge contains water. Unless the sponge is treated before drying it is necessary to dry it twice. If wet sponge which has not been dried after curing is treated with an emulsion, an emulsion of relatively high oil content will be used, and if the process is continuous it will ordinarily be desirable to draw off from the treating tank some of the emulsion, from time to time or continuously, and add oil to it. If wet sponge is treated with unemulsified oil, water squeezed from the sponge will collect in the bottom of the oil tank and may be removed from time to time or continuously.

The indentation of any given cured sponge which contains no oil will vary with the amount of oil added to it. The first 25 per cent of oil (based on the weight of the sponge) dissolved into the rubber increases the indentation 25 per cent. When an additional 25 per cent of oil has been dissolved into the sponge, making a total of 50 per cent, the indentation is returned to substantially that of the sponge in which no oil has been dissolved. It continues to decrease with the addition of more oil until when 100 per cent of oil (based on the weight of the sponge) has been dissolved into the sponge the original indentation is reduced about 30 per cent.

Swelling has no appreciable effect on the permanent set or aging properties of the sponge. Although tensile strength is rarely considered in any discussion of rubber sponge, it is reduced by swelling; several hundred per cent of white oil may be incorporated in natural-rubber sponge without reducing the tensile below that satisfactory for mattresses, cushions, etc.

CONCLUSION

The process is capable of wide variation to produce a variety of products. Oil may be introduced into the sponge only before curing, and not after. It may be added to the sponge only after curing. Some may be added before curing and some after. Although a product which is preferred for most purposes is obtainable by omitting both foaming and gelling agents, the invention also includes the production and treatment of sponge which contains a foaming or gelling agent or both. By adding oleic acid to white oil (or other oil) a larger amount of oil than has heretofore been possible may be incorporated into latex, which may thereafter be foamed and cured according to prior art methods. Likewise the prior art cured sponges, whether chemical sponge or foamed-latex sponge, may be swelled by oil.

What I claim is:

1. The process of dissolving unemulsified white oil into natural-rubber latex which comprises mixing two parts by weight of oleic acid with 100 parts by weight of the white oil, and then dissolving the mixture into the rubber of the latex.

2. The process of dissolving unemulsified white oil into the rubber particles of natural-rubber latex which comprises effecting the solution of the oil in the presence of one to five parts by weight of oleic acid per 100 parts by weight of the oil.

3. The process of producing foamed latex sponge which comprises curing a foamed natural-rubber latex which comprises at least 5 parts by weight of white oil per 100 parts of rubber in the latex, curing, then dissolving at least 5 parts by weight additional white oil uniformly into the sponge.

4. The process which comprises incorporating at least 10 parts by weight of white oil in natural-rubber latex (based on the weight of the rubber in the latex), producing a foam from the mixture, curing the foam and then dissolving uniformly into the product at least 50 parts by weight (based on the weight of the sponge) of white oil, whereby the cured product is caused to increase in volume.

5. The process which comprises incorporating at least 25 parts by weight of white oil in latex of natural rubber (based on the weight of the rubber in the latex), producing a foam from the mixture, curing the foam to produce a slightly undercured product, and then dissolving into the sponge substantially 100 parts by weight (based on the weight of the sponge) of white oil and thereby increasing the volume of the sponge.

6. The continuous process of swelling sponge which comprises passing a sheet of resilient open sponge formed at least in part of natural rubber which is at least partially cured, through a zone in which white oil is incorporated into the sponge and uniformly distributed therein in an amount not in excess of the amount capable of being dissolved into the walls of the sponge, and then passing the sponge through a zone in which the oil so incorporated is dissolved uniformly into the sponge without leaving undissolved oil on the walls of the sponge.

7. The method of compounding natural-rubber latex which comprises uniformly distributing a compounding ingredient in white oil free from water and containing several per cent of oleic acid, and then mixing the oil and latex and dissolving the oil into the rubber of the latex.

References Cited in the file of this patent

UNITED STATES PATENTS

| Number | Name | Date |
|---|---|---|
| 1,852,447 | Chapman et al. | Apr. 5, 1932 |
| 1,995,319 | Murphy et al. | Mar. 26, 1935 |
| 2,031,960 | Kempel | Feb. 25, 1936 |
| 2,138,081 | Wolf | Nov. 29, 1938 |
| 2,140,026 | Murphy et al. | Dec. 13, 1938 |
| 2,147,680 | Stevens | Feb. 21, 1939 |
| 2,226,517 | Binns | Dec. 24, 1940 |
| 2,261,439 | Kelly | Nov. 4, 1941 |
| 2,304,717 | Swart | Dec. 8, 1942 |
| 2,426,430 | Binns | Aug. 26, 1947 |
| 2,512,475 | Bau | Jan. 20, 1950 |

FOREIGN PATENTS

| Number | Country | Date |
|---|---|---|
| 436,965 | Great Britain | Oct. 22, 1935 |